United States Patent
de Salaberry

(10) Patent No.: US 6,640,630 B1
(45) Date of Patent: Nov. 4, 2003

(54) VIBRATING GYROSCOPE

(76) Inventor: Bernard de Salaberry, 4 bis, rue de la Ceinture - 78000, Versailles (FR)

(*) Notice: Subject to any disclaimer, the term of this patent is extended or adjusted under 35 U.S.C. 154(b) by 0 days.

(21) Appl. No.: 09/890,422
(22) PCT Filed: Jan. 31, 2000
(86) PCT No.: PCT/FR00/00210

§ 371 (c)(1),
(2), (4) Date: Jul. 31, 2001

(87) PCT Pub. No.: WO00/45127

PCT Pub. Date: Aug. 3, 2000

(30) Foreign Application Priority Data

Feb. 1, 1999 (FR) .............................................. 99 01074

(51) Int. Cl.⁷ ............................................... G01P 9/04
(52) U.S. Cl. ................................................. 73/504.13
(58) Field of Search ........................... 73/504.13, 504.12

(56) References Cited

U.S. PATENT DOCUMENTS 4,951,508 A * 8/1990 Loper et al. .............. 73/504.13
5,226,321 A * 7/1993 Varnham et al. ......... 73/504.13

* cited by examiner

*Primary Examiner*—John E. Chapman
(74) *Attorney, Agent, or Firm*—William A. Drucker

(57) ABSTRACT

The invention relates to a vibrating gyroscope comprising vibrating cylinder (1) that is magnetically or electrostatically excited. Regularly distributed masses (19) designed to lower the vibration frequency of said cylinder are arranged thereon. The inventive gyroscope is much more accurate than conventional gyroscopes and can be produced easily at low cost. The invention can be used to measure angular rotation or angular speed.

10 Claims, 6 Drawing Sheets

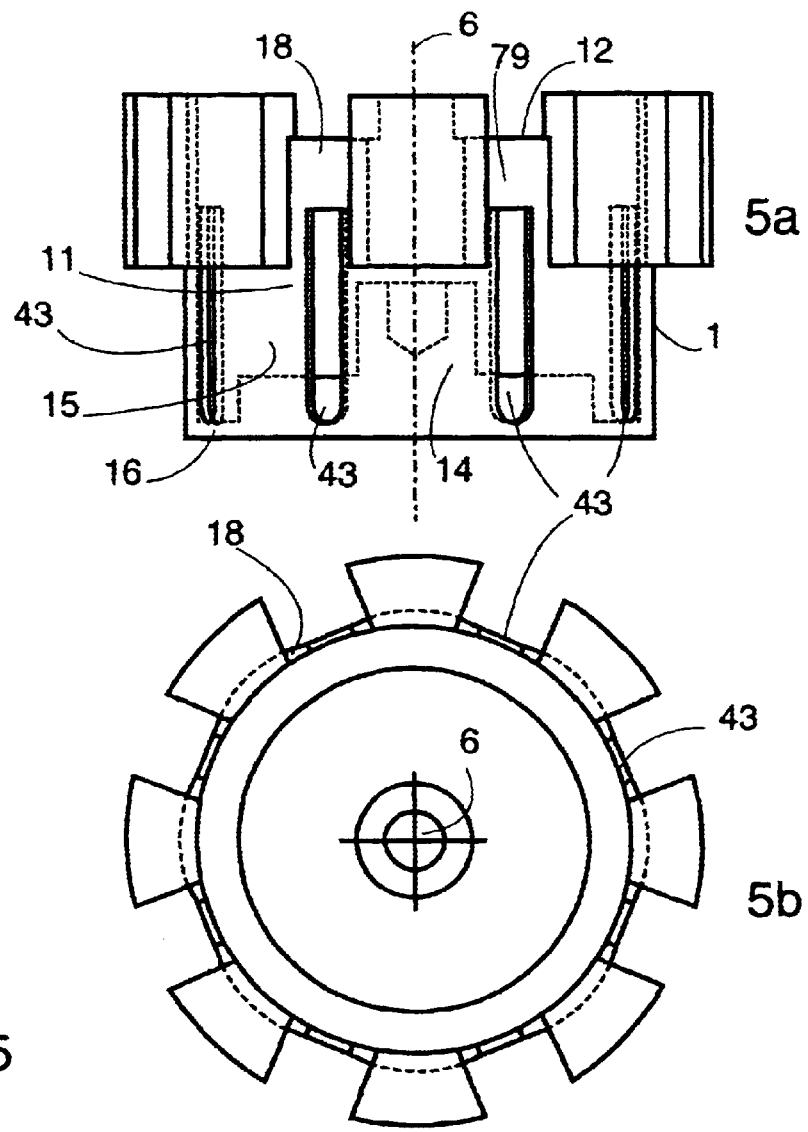
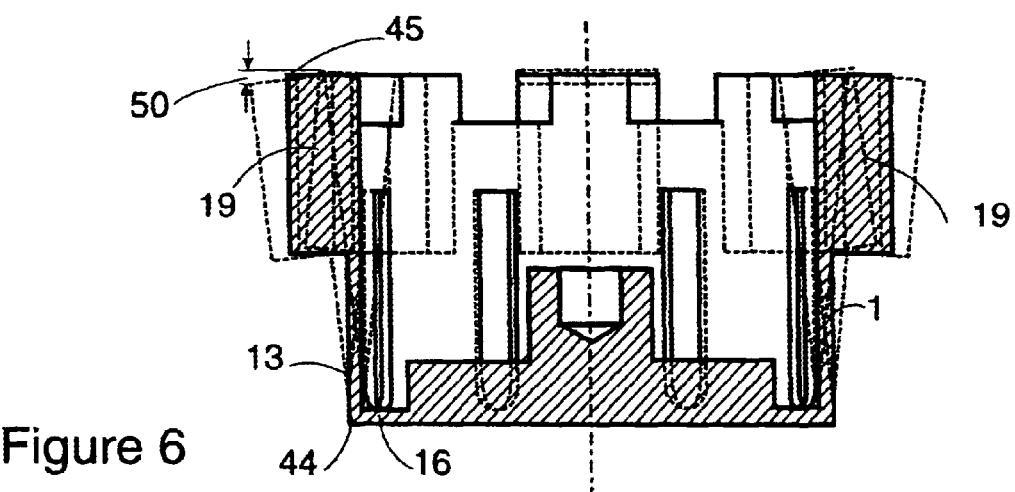
Figure 5
Figure 6

VIBRATING GYROSCOPE

BACKGROUND OF THE INVENTION

1. Field of the Invention

The present invention concerns a vibrating gyroscope for accurately measuring angular rotations. Compared with the techniques generally used, this gyroscope proves to be more effective, occupies less space, is simple to embody and is less expensive.

2. Description of the Invention

Vibrating gyroscopes are based on the effect of Coriolis forces due to a rotation imposed on moving masses.

Several embodiments have been previously proposed for embodying a vibrating element sensitive to angular speeds.

The method most frequently used consists of making an annular, hemispherical or cylindrical test body of revolution vibrate perpendicular to its axis of symmetry and of observing the movement of the vibration modes when it is subjected to rotation around said axis.

In the most general case of annular, hemispherical or cylindrical test bodies, the main difficulty derives from the compromise that has to be made between the resonance frequency which increases with the spatial requirement reduction and the time constant which determines the performance and which is improved when the resonance frequency is low. For example, it is virtually impossible to embody a cylindrical test body having a thin wall, a volume smaller than 2 cm3 and a resonance frequency lower than 6 kHz. Now it would be desirable to have small test bodies resonating only between 2 and 3 kHz so as to obtain much improved performances.

The second difficulty originates from the embodiment of the excitation and vibration measuring device, it being understood that the term 'excitation' denotes all the commands required for the proper functioning of these gyroscopes.

Solution put forward to date for creating, detecting and maintaining vibration are basically of the electromagnetic, electrostatic or piezo-electric types.

The electrostatic solutions have advantageous performances when they are used under vacuum so as to reduce losses. Because they require extremely small air gaps, they are difficult to implement inside or outside a hemispherical or cylindrical wall and are thus generally expensive.

The piezo-electric solutions use either a cylinder made fully of a piezo-electric material, or small piezo-electric elements mounted, most frequently by glueing, on a metal cylinder. The solutions have one major drawback when used in gyrometric applications for which they are basically adapted of being unable to adjust the axis of excitation with respect to the vibrating body which generally has one overriding direction for which performances are optimum.

For various reasons and in particular for reasons of cross talk, the means for detecting and exciting the vibrations of certain embodiments, are heterogeneous and are spaced as far a s possible from one another.

For example, the U.S. Pat. No. 4,793,195 describes a gyrometer with a vibrating cylinder provided with electrostatic detection and magnetically excited at a frequency half its vibration frequency so as to reduce these effects.

The French patent application 97/12129 describes a gyrometer with multiplexed magnetic detection and excitation which clearly resolves the difficulty of crosstalk between excitation and detection but whose performances are limited by Vie resonance frequency which remains high.

OBJECT OF THE INVENTION

The present invention brings about an improvement which, in a given spatial requirement, makes it possible to choose the resonance frequency and via its principle offers new possibilities for simply and cheaply embodying electromagnetic or electrostatic detection and excitation means.

So as to reach this result, the thin-walled test body of revolution comprises at its periphery evenly distributed masses separated by intervals which increase the moving mass when said test body is excited on vibration Openings can be fitted in the thin wall of the cylinder and not covered by the masses so as to adjust the stiffness of the end of these masses and thus the resonance frequency. This makes it possible to significantly reduce the resonance frequency of said test body and thus increase performances.

By acting on the shape of the openings, it is possible to favour certain types of movements of additional masses and thus embodying inexpensive flat electrostatic or magnetic detection/excitation units able to be placed at the right of a flat open extremity of the test body and thus extremely easy to adjust.

SUMMARY OF THE INVENTION

Thus, the invention concerns a vibrating gyroscope of the type comprising:

a thin and vibrating element and approximately generated by rotation, excitation means for generating vibrations at least one point of the vibrating element so as to make appear on said vibrating element vibration modes able to be modified under the effect of an angular speed of rotation, and means for detecting said vibrations and arranged so as to be able to detect said vibration modes, characterised in that the vibrating element approximately generated by rotation at receives at least three and preferably eight masses forming vibrating masses and preferably constituted by excessive thicknesses of the vibrating element itself.

BRIEF DESCRIPTION OF THE DRAWINGS

There follows hereafter non-restrictive embodiments of the invention given solely by way of example with reference to the accompanying drawings on which:

FIG. 5 shows two views of a variant of the test body of the vibrating gyroscope of FIG. 2, FIG. 6 is a cutaway side view of the variant of the test body of FIG. 5.

DESCRIPTION OF THE PREFERRED EMBODIMENTS

Figure 1:
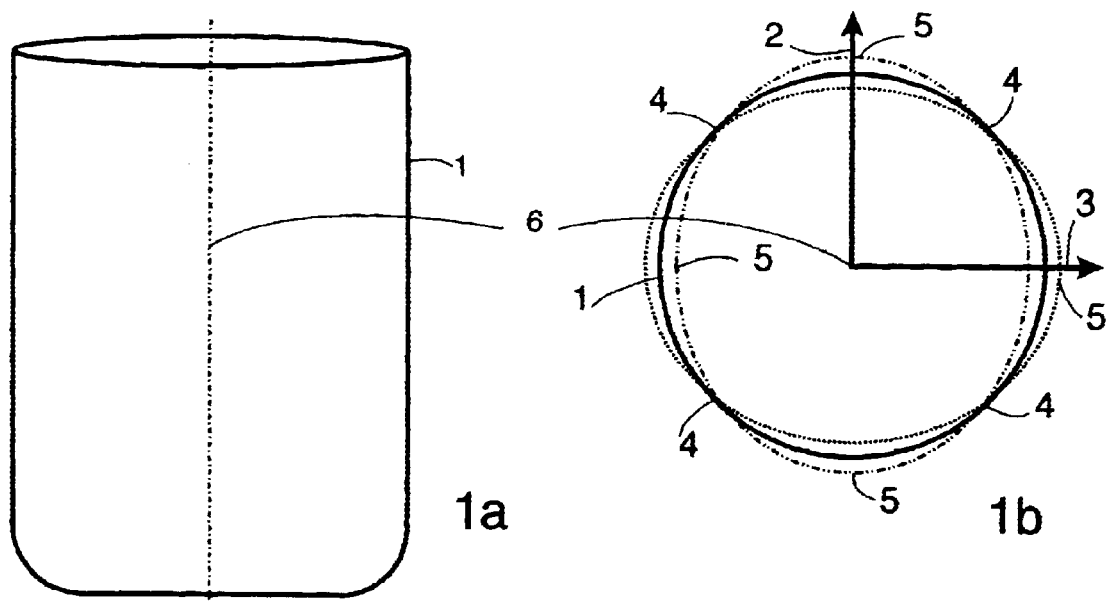
FIG. 1 is a skeleton diagram showing the functioning of a vibrating gyroscope.

As previously mentioned and shown on FIG. 1, a vibrating gyroscope comprises a test body 1, having an axis of symmetry 6, cylindrical for example (FIG. 1a) but which can be hemispherical or have any other shape of revolution, and which is excited on vibration (FIG. 1b) along two initial directions 2 and 3 perpendicular to each other and to the axis 6 of the test body 1 so that four nodes 4 and four vibration antinodes 5 appear, the movements of the portions situated on the vibration antinodes being in phase opposition for the two initial excitation directions 2 and 3.

When the test body 1 is subjected to an angular speed rotation $\Omega$ around an axis parallel to the axis of symmetry 6, the vibration nodes do not rotate with the test body. They no longer remain fixed in space but they rotate with respect to the inertial space at an angular speed $\omega=K.\Omega$ which depends on the geometry and angular speed of the test body. The theoretical ratio K between the angular speed of the test body and that of the vibration nodes also depends on the vibration mode. For example, it is possible to make the test body vibrate with six vibration nodes and six vibration antinodes, but the corresponding configuration is less favourable for the gyroscopic measurement.

Thus, the vibration nodes 4 are not linked to the test body 1, but move with respect to the latter with an angular speed, also proportional to the angular speed of the test body itself.

Figure 2:
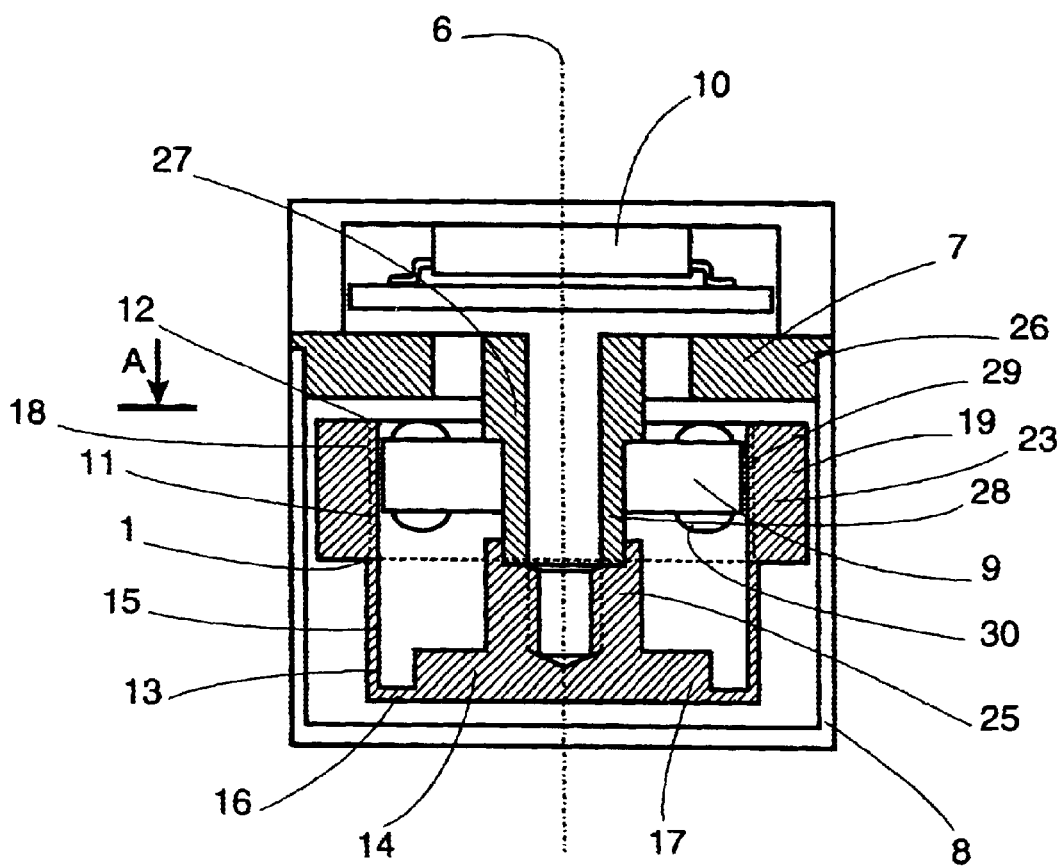
FIG. 2 is a cutaway side view of the vibrating gyroscope of the invention.

FIG. 2 shows a cutaway view of a preferred embodiment of the vibrating gyroscope of the invention.

This comprises:

a test body or vibrating cylinder 1, a support 7, an external cylindrical box 8, a magnetic detector exciter or stator 9, an electronic circuit 10, fixing, cabling and closing means.

The test body is embodied in the form of an approximately cylindrical. vibrating element or vibrating cylinder 1 having an axis of symmetry 6, a wall 11 open at one of its extremities 12 and closed at its other extremity 13 by a wall forming a bottom 14. The wall 11 of the vibrating cylinder 1 is thin and regular on one portion of its length 15 close to the bottom 14. Said bottom comprises an external portion 16 having approximately the same thickness as that of the wall 11 of the cylinder and at the centre a thicker portion 17.

Figure 3:
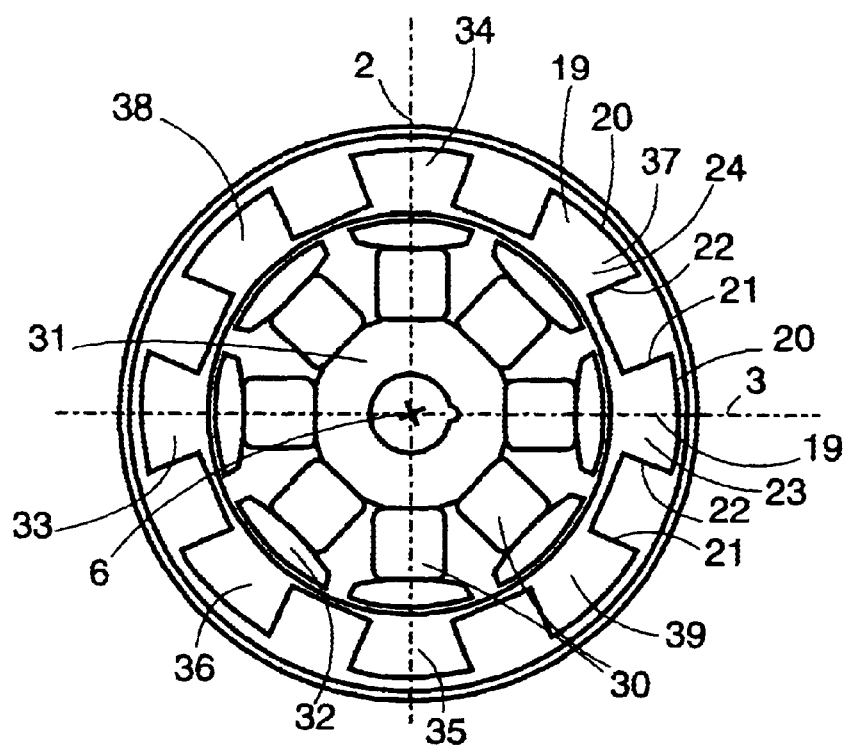
FIG. 3 is an axial cutaway view showing the vibrating gyroscope of FIG. 2 along the direction A.

The wall 11 of the vibrating cylinder bears on one portion of its height 18 close to its open extremity 12 at least three and preferably eight excess thicknesses or masses 19 evenly distributed and whose shape can be any. In one preferred embodiment of the invention, the height of these excess thicknesses 19 is parallel to the axis of symmetry 6 of the test body and approximately equal to half the total height of said test body. Their section as shown on FIG. 3 perpendicular to the axis of symmetry 6 is externally bordered by an arc of a circle 20 centred on said axis of symmetry 6. It is bordered on the sides by two blanks 21 and 22 parallel to said axis of symmetry and orientated so that one blank 21 with an excess thickness 23 is parallel to one immediately adjacent blank 22 with an excess thickness 24. This arrangement facilitates machining of said excess thicknesses by means of milling.

The bottom 14 is fixed at its centre onto the support 7 by an internal foot 25.

The support of revolution 7 comprises a first portion 26 whose diameter is such that it is able to receive the external box 8, and a second portion comprising two successive decreasing diameters 27 and 28, the second diameter being used to act firstly as a support for the magnetic stator 9 on which coils 30 are placed, and secondly as a support for the vibrating cylinder 1.

It is dimensioned so that the stator 9 is placed centred in the open extremity 12 of the vibrating cylinder 1 thus providing an air gap 29 having a thickness reduced as far as possible.

The magnetic exciter is embodied in the form of an eight-branched star 31 and thus comprises eight poles 32 on which the coils 30 are placed.

As described above, the gyroscope of the invention functions as follows by first of all making the hypothesis that the losses are nil and that the vibrations once established conserve their energy. The vibrations are initially created on two pairs of masses 23, 33 and 34, 35 for example placed on two perpendicular axes 3 and 2, the other four masses 36 to 39 not vibrating. In the absence of rotation, the vibrating state does not change. In the presence of a rotation $\Omega$ around the axis 6, the effect of the Coriolis forces results in a transfer of energy of the masses which initially vibrated towards the latter which did not vibrate so that the total energy is retained. If A is the initial peak amplitude of the vibrations of the two pairs of masses 23, 33 and 34, 35, the peak amplitude of these vibrations at the end of a time t is written:

$$A=A.\cos[2(1-K), f\Omega.dte].$$

Similarly, the peak amplitude of the vibrations of the four other masses 36, 37 and 38, 39 is written:

$$B=A.\sin[2(1-K), f\Omega.dte].$$

Because the losses by rubbing in the material are not nil, the vibrations tend to dampen and need to be maintained so as to ensure functioning of the gyroscope.

To this effect, by using the well known principles of electronic circuits, the amplitudes of the vibrations of each of the 4 pairs of masses are measured and are used to draw up holding and correction voltages which are sent to the windings. Advantageously, the principles for multiplexing excitation and detection described in the French patent application no 97/12129 shall be used For a gyrometer usage, again using the well-known principles of counter-reaction and preferably the multiplexing technique, the four masses 36, 37, 38 and 39 are kept immobile by sending to the corresponding windings a counter-reaction voltage opposing the effects of the Coriolis forces. This counter-reaction voltage is then representative of the angular speed $\Omega$. The vibration amplitude of the masses 23, 33, 34 and 35 is kept constant.

Figure 4:
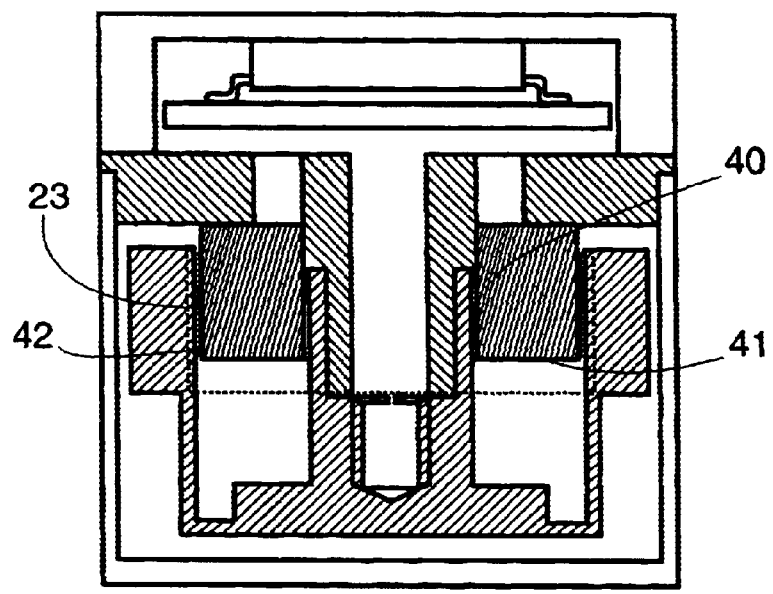
FIG. 4 is a cutaway side view of the vibrating gyroscope of FIG. 2 in a variant with excitation and electrostatic detection.

Thus as shown on FIG. 4, the electromagnetic detection/excitation unit 9 can be replaced by an electrostatic detection/excitation unit 40. To this effect, the stator 9 of FIG. 2 is replaced by a ring 41 made of a non-conducting material with at least two and preferably eight or more electrodes 42 being placed on the periphery of said ring. The outer diameter of this ring is such that the electrodes are found opposite the internal face of the cylinder 1 with an air gap 29 reduced as much as possible.

So as to improve the performances of the vibrating gyroscope, it may be necessary to reduce the stiffness provided by the thin portion of the vibrating cylinder. As shown on FIG. 5, one first variant of the invention consists of embodying in the thin wall 11 of the vibrating cylinder openings 43, said openings being evenly distributed and centred approximately between the masses 19. Seen from the side, FIG. 5*a* shows a vibrating cylinder pierced with eight relatively fine long openings 43 whose largest dimension is approximately parallel to the axis 6. These openings preferably go down as far as the thin portion 16 of the bottom 14 of the vibrating cylinder. At their other extremity, they may be closer or further away from the upper portion of the thin wall 11 of the cylinder remaining between the masses, the thin wall portion remaining between said openings 43 and the extremity 12 of the cylinder constituting the elastic bridges 79 between the masses 19. Moreover in the example shown, the height and position of the additional masses are such that the latter go past the height of the cylinder itself, thus forming notches on the side of the open extremity 12 of said cylinder 1.

FIG. 6, which is a cutaway view of the vibrating cylinder described above, shows, by exaggerating it with respect to reality, the movement of two of the masses 19 under the effect of the vibrations. Because of the shapes retained and the position of the openings, it appears that the masses 19 on vibrating carry out a rotation movement approximately centred at a point 44 corresponding to the joining point between the extremity 13 of the cylinder 1 and the flat thin wall 16. If one considers the movement from an upper corner 45 of the mass 19, this drawing shows that under the effect of this rotation the upper portion of the masses and in particular the point 45 is moved firstly by a translation movement perpendicular to the axis 6, and secondly by a translation movement 50 parallel to said axis 6 but with a much more reduced amplitude.

Figure 7:
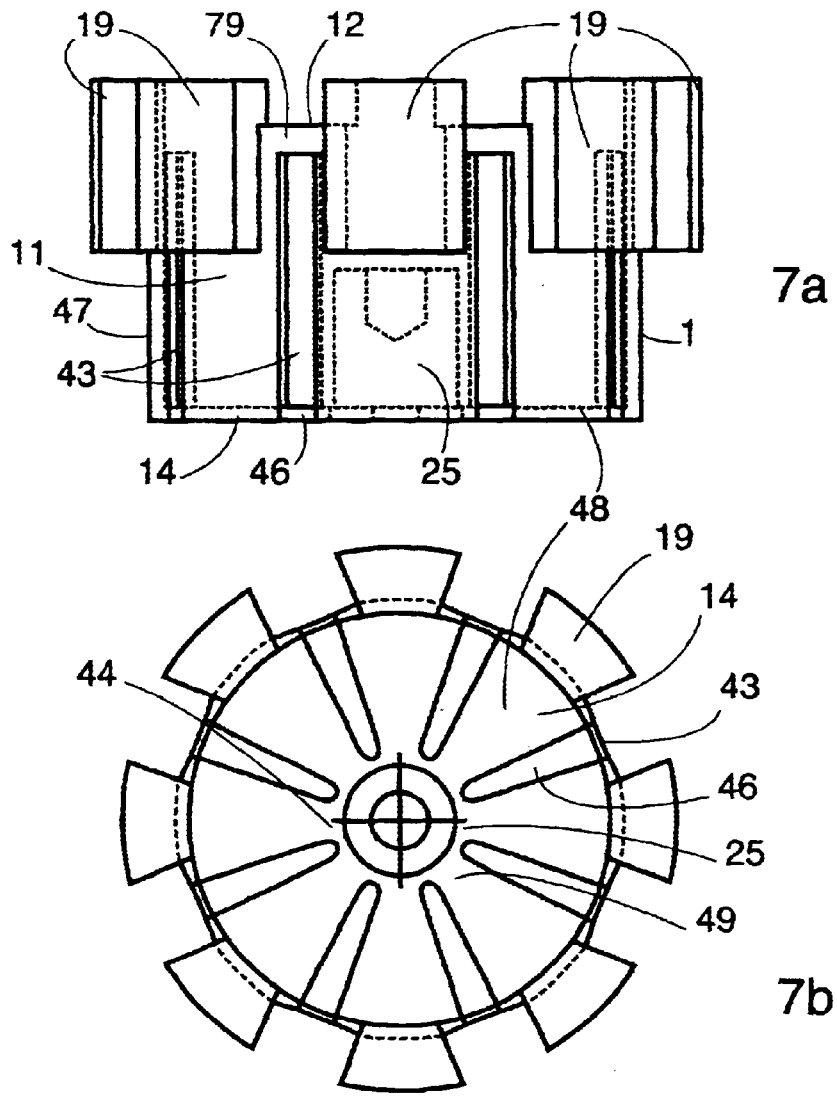
FIG. 7 shows two views of a preferred variant of the test body of the vibrating gyroscope of FIG. 2.

Still with the aim of improving the performances by adjusting as best as possible the rigidities and the masses, it is possible to extend the openings 43 made in the wall 11 of the vibrating cylinder 1 onto the bottom 14 in the direction of the foot 25. FIG. 7 is divided into FIG. 7*a* and 7*b*, the first being a side view of the test body and the other a top view of said body. The openings 43 are extended by grooves 46, preferably radial, on the bottom 14. These grooves 46 are preferably narrowed towards the centre and the masses 19 are therefore connected to the centre by a cylindrical wall portion 47 and by a flat sector 48 perpendicular to said cylindrical wall portion 47, said flat sector comprising a narrowing 49 close to the centre.

In addition, the openings 43 are extended on the wall 11 between the masses 19 in the direction of the extremity 12 of the vibrating cylinder 1 so that the remaining portion of said wall 11 between, said masses 19 is approximately reduced and constitutes an elastic bridge 79 between these masses.

Figure 8:
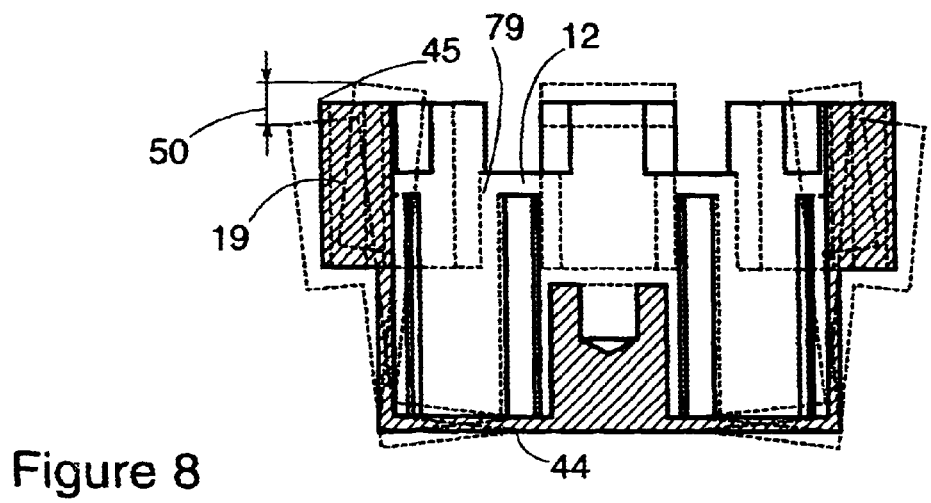
FIG. 8 is a cutaway side view of the variant of the test body of FIG. 7.

Because of the narrowing 49 and the elongation towards the extremity 12 of the openings 43, the most flexible portion of the link between the masses and the centre is located exactly at the location of this narrowing 49. Thus, as shown on FIG. 8, the hinge point 44 of the movement of the masses 19, which is located approximately at this most flexible location, is thus much closer to the axis 6 than that of the preceding variant of FIG. 6. FIG. 8 also shows the movement of the masses 19 in the configuration of FIG. 7. It appears that the translation movement 50 parallel to the axis 6 from the corner 45 is much larger and it can also be used to excite and detect the vibrations with an excitation/detection system having a flat interface with the vibrating element, said interface being constituted by air gaps 29, as shown on FIG. 9. In this configuration, the shape of the elastic bridges 79 is determined so as to harmonise the various rigidities and avoid creating parasitic resonance frequencies too close to the nominal frequency of the test body.

Figure 9:
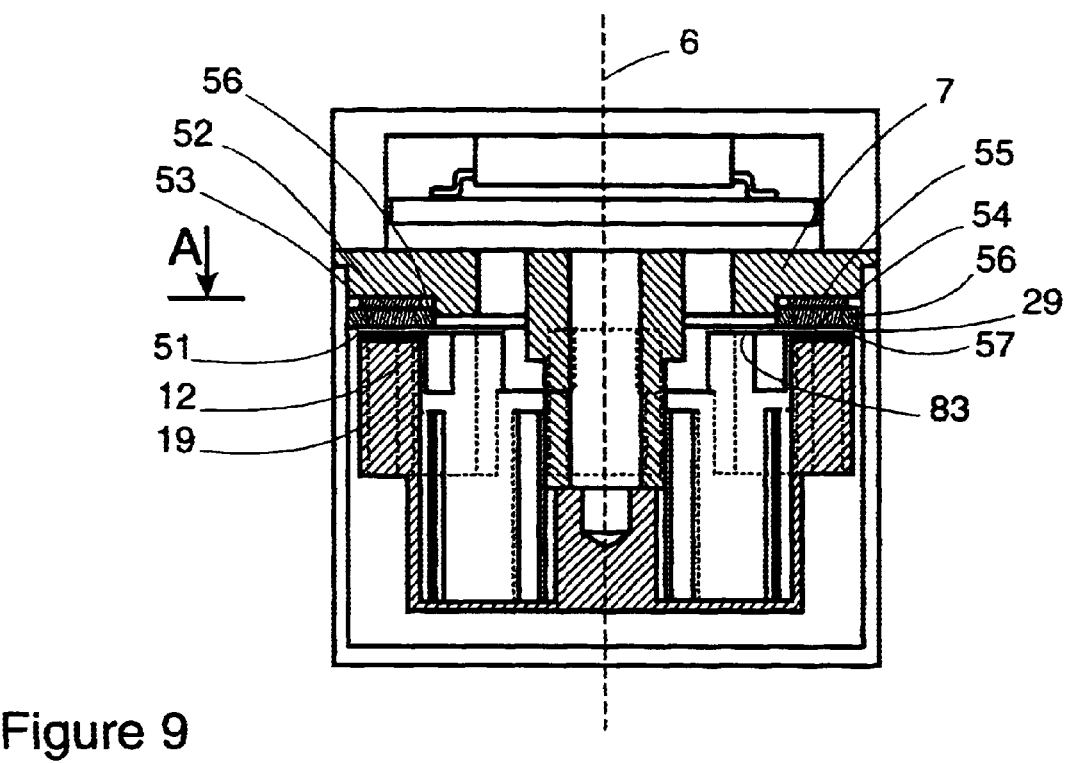
FIG. 9 is a cutaway side view of a variant of the gyroscope of FIG. 2 using the test body of FIG. 7 and a flat electromagnetic excitation/detection unit.

FIG. 9 thus shows a cutaway view of a first example of the gyroscope using this translation movement parallel to the axis 6 with an electromagnetic excitation/detection system having along with the vibrating element an interface of revolution 83 centred on the axis 6 and preferably flat. The masses 19 having a section perpendicular to the large axis 6 can be embodied with one extremity or face 51 situated on the side of the open portion 12 of the vibrating cylinder, said section being flat and thus able to be used with a simple electromagnet, the faces 51 of each of the masses 19 being approximately coplanar.

The detection/excitation unit then includes at least two, but preferably eight electromagnets 52 secured to the support 7 and whose magnetic cores 53 each have one flat extremity 54. Said flat extremities 54 are coplanar between one another and each extremity is placed opposite a flat extremity 51 from one of the masses 19 with an air gap 29 reduced as much as possible, the air gaps 29 forming the interface 83.

It is to be noted that the interface 83 could be slightly conical or even spherical or more generally have a not fully flat shape without departing from the context of the invention.

Figure 10:
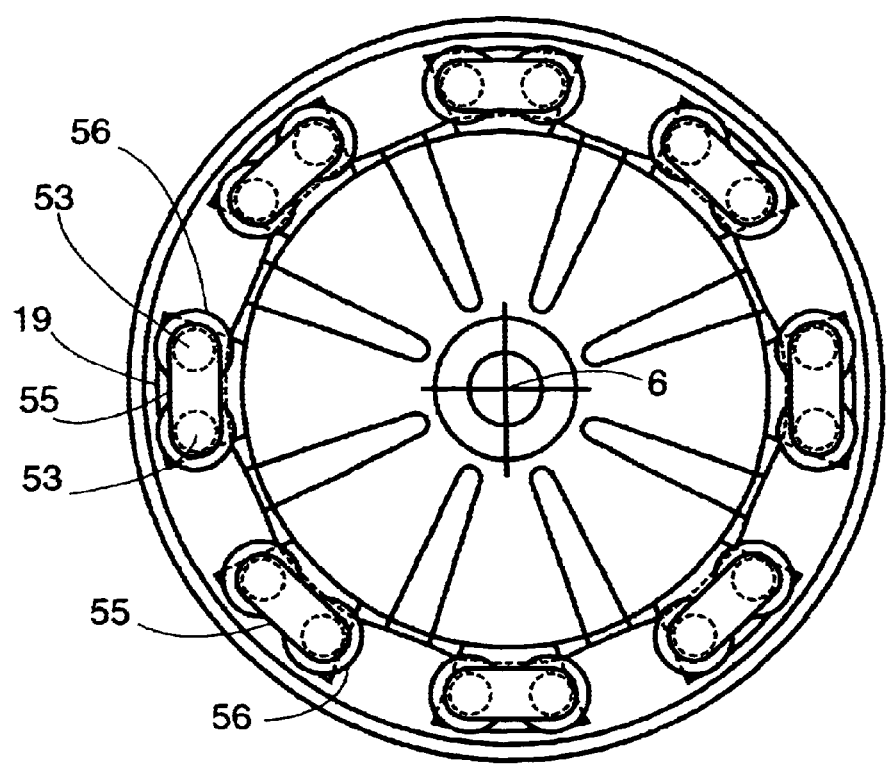
FIG. 10 is an axial cutaway view of the variant of the gyroscope of FIG. 9 along the direction A.

So as to be more effective by reducing losses, each of the electromagnets may include, as shown on FIG. 10, two short cores 53 having axes approximately parallel to the axis 6, each core preferably being placed at an equal distance from said axis 6, said cores being interconnected, preferably two by two, by a magnetic reinforcement 55 secured to the support 7 opposite the flat face 51 of the rings 19. A winding 56 is placed around each of these cores 53. So as to further reduce the magnetic losses, a plate 57 made of a low loss magnetic material and preferably having the same surface as the section of the masses 19, is secured to each flat face 51 of said masses and via the air gap 29 close a magnetic circuit constituted by a pair of cores 53 and their reinforcement 55. The outer face of the magnetic plate then constitutes the flat face 51.

In this configuration as in the configuration of FIG. 4, the gyroscope may advantageously use the multiplexing technique described in the French patent application no 97/12129. It can also be used as a gyroscope or a gyrometer.

Figure 11:
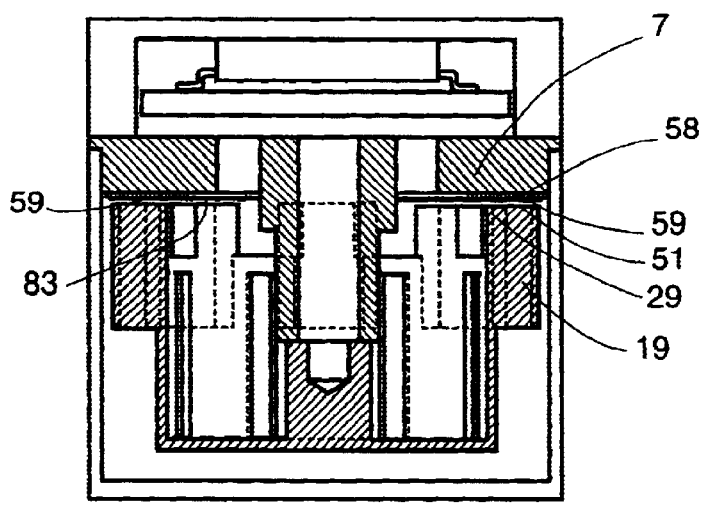
FIG. 11 is a cutaway side view of a variant of the gyroscope of FIG. 9 and using a flat electrostatic excitation/detection unit.

The vibrating cylinder of FIG. 7 is also clearly suitable in the use of an electrostatic flat interface detection/excitation system, as shown on FIG. 11 showing also a gyroscope equipped with this system. This system comprises a non-conducting crown 58 secured to the support 7 opposite the flat faces 51 of the masses 19. Secured to this crown are at least and preferably eight electrodes 59, each electrode being placed opposite one of the faces 51 of said masses 19.

The vibrating cylinder is positioned on the support so that the air gap 29 between the electrodes and the faces 51 constituting the interface 83 is as reduced as possible.

Figure 12:
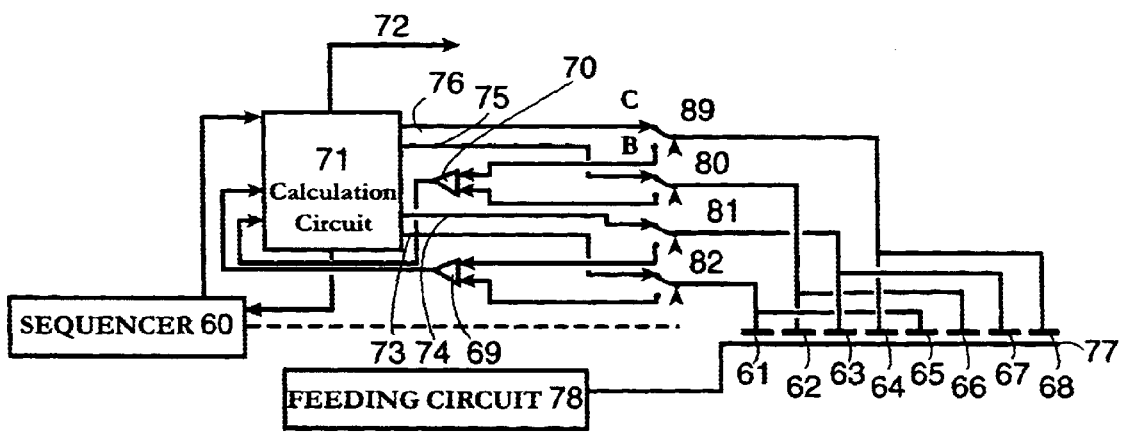
FIG. 12 is a skeleton diagram of the electric and electronic circuits of the vibrating gyroscope of the invention in the multiplexing version with excitation and detection functions adapted to the electrostatic detection and excitation gyroscopes of FIGS. 4 and 11.

This latter variant preferably uses one multiplexed electronics unit whose principle is shown on the diagram of FIG. 12 and which avoids any problem of crosstalk between the excitation signals and the detection signals.

In this solution, the electrodes 59 are in turn used to excite and then detect the vibrations of each of the masses, knowing that it is also possible to use one portion of the electrodes for detection and use the others for excitation.

The electrodes are connected by pairs, the electrodes of a given pair being placed symmetrically with respect to the axis 6.

The faces 51 of the electrically interconnected masses 19 form a counter-electrode 77 fed by a circuit 78.

Each of the pairs of electrodes is connected to a circuit changer 89, 80, 81, 82 and controlled by a sequencer 60. When the circuit changers are in the position B, the system functions in detection mode. When they are in the position C, they function in the excitation mode.

In the detection mode, the signal derived from the pairs of electrodes firstly respectively 61, 65 and 63, 67 and secondly 62, 61 and 64, 68 are sent by means of two differential amplifiers 69 and 70 respectively to a calculation circuit 71 which works out on four outlets 73, 74 and 75, 76 respectively four excitation voltages two by two in antiphase sent to the pairs of electrodes by means of the circuit changers when the latter move into the excitation position C.

The calculation circuit 71 works out the excitation frequency so that the latter corresponds to the resonance frequency of the masses of the vibrating cylinder.

The circuit 71 works out outgoing information 72 which represents the, rotation fΩ.dt of the gyroscope.

The sequencer 60 is synchronised by the excitation frequency with the aid of a signal derived from the calculation circuit 71.

The calculation circuit also makes the corrections required to the errors brought about by the residual resonance deviations existing between the two vibration modes situated 45° from each another.

In a gyrometer use mode, the calculation circuit controls the vibration of the masses situated opposite the electrodes 62, 66 and 64, 68 to be nil, both in phase and in quadrature and thus compensate the resonance deviations.

The operating frequency of the sequencer 60 is a submultiple of the actual frequency of the vibrating cylinder 1. The cyclic ratio of switching between the excitation time and the detection time may be 1/1. It can also advantageously be 1/2, 1/3, 1/4 or even lower, this depending on the excess voltage of said vibrating cylinder. The switchings of the excitation function to the detection function are preferably carried out at the time when the voltage on the electrodes 61 to 68 moves to zero. The switchings of the detection, function to the excitation function are preferably carried out at the time the voltage control sine wave in said electrodes moves to zero.

So as to obtain better distribution of the various resonance modes of the vibrating element, it is possible to replace all or part of the cylindrical wall 11 and the bottom 14 of the vibrating cylinder by a curved surface and apply to this new element all the arrangements and improvements described above, this new vibrating element then having for example a hemispherical, ellipsoid, parabolic shape etc., without departing from the context of the invention.

Finally, the use of additional masses can also be applied to a ring-shaped vibrating element without departing from the context of the invention.

What is claimed is:

1. Vibrating gyroscope comprising: a thin wall hollow vibrating cylindrical element having a bottom, a foot centered on said bottom, an open extremity, and at least eight vibrating masses spaced evenly on said element and located close to said open extremity said masses forming excess thickness on said vibrating element so as to obtain a reduced resonance frequency of said vibrating element, said vibrating element further comprising excitation means for generating vibrations on at least one point of the vibrating element so as to have appear on said vibrating element vibration modes able to be modified under the effect of an angular rotation speed, and means for detecting said vibrations and placed so as to be able to detect said vibration modes.

2. Vibrating gyroscope according to claim 1, wherein said vibrating element comprises openings evenly spaced and centred approximately between said masses.

3. Vibrating gyroscope according to claim 2, wherein the shape of the openings is elongated, their largest dimension being approximately parallel to the axis.

4. Vibrating gyroscope according to claim 3, wherein said openings made in said thin wall of said vibrating cylinder are extended on the bottom of said vibrating cylinder by notches, radial and narrowed towards said foot.

5. Vibrating gyroscope according to claim 4, wherein said masses each has a surface situated on a surface of revolution centred on the axis and arc flat, said surface of revolution constituting an interface for a system for exciting and detecting vibrations.

6. Vibrating gyroscope according to claim 5, comprising a detection/excitation unit having a flat interface approximately generated by rotation centred on the axis constituted by at least two electromagnets secured to a support each of said electromagnets having two magnetic cores interconnected by a magnetic reinforcement and placed opposite the faces of the masses, so as to form a magnetic circuit closed via an air gap constituting the interface by a magnetic plate secured to the face of each of the masses.

7. Vibrating gyroscope according to claim 4, comprising a detection/excitation unit having, together with the vibrating element, a flat interface approximately generated by rotation centred on the axis constituted by at least two electrodes secured to a non-conducting crown secured to a support and placed opposite the faces of the masses and separated from said masses by an air gap constituting the interface.

8. Vibrating gyroscope according to claim 3, wherein the openings made in the wall of said vibrating cylinder are extended between the masses towards said extremity of the vibrating cylinder so that the remaining portion of the wall between said masses is approximately reduced and constitutes an elastic bridge between said masses.

9. Vibrating gyroscope according to claim 1, comprising an electrostatic detection/excitation unit including at least two electrodes connected to means for alternatively providing excitation and detection functions of vibration movements of the vibrating element.

10. Vibrating gyroscope according to claim 9, comprising eight electrodes connected to said means for alternatively providing the excitation and detection functions of vibration movements of the vibrating element.

* * * * *